United States Patent [19]

Wiseman et al.

[11] 3,859,109

[45] Jan. 7, 1975

[54] PIGMENT PRODUCTION

[75] Inventors: Thomas James Wiseman, Richmond; Peter Barry Howard, Yarm, both of England

[73] Assignee: British Titan Limited, Billingham, Teesside, England

[22] Filed: Mar. 22, 1973

[21] Appl. No.: 343,977

[30] Foreign Application Priority Data
Mar. 23, 1972 Great Britain.................... 13725/72

[52] U.S. Cl. .............................................. 106/300
[51] Int. Cl. ........................... C09c 1/36, C09c 1/62
[58] Field of Search .................................... 106/300

[56] References Cited
UNITED STATES PATENTS
2,296,636  9/1942  Hanahan............................ 106/294

2,357,089  8/1944  Daiger et al. ...................... 106/300
3,515,566  6/1970  Mood et al. ....................... 106/300

FOREIGN PATENTS OR APPLICATIONS
1,034,345  1/1960  Great Britain...................... 106/300
476,439    8/1951  Canada.............................. 106/300

Primary Examiner—James E. Poer
Assistant Examiner—John P. Sheehan
Attorney, Agent, or Firm—Schuyler, Birch, Swindler, McKie & Beckett

[57] ABSTRACT

Treatment of titanium dioxide by adding to an aqueous suspension thereof containing a water-soluble silicate an acidic source of a soluble oxide of zirconium, hafnium or titanium while maintaining the pH of the suspension at a value in the range 1 to 3.5 to precipitate a hydrous oxide of silicon and thereafter raising the pH to effect the complete precipitation of the hydrous oxide of zirconium, hafnium or titanium.

18 Claims, No Drawings

PIGMENT PRODUCTION

This invention relates to a process for the production of a pigment, particularly titanium dioxide pigment.

For many years it has been the practice to coat titanium dioxide pigments with one or more hydrous oxides of silicon, aluminium or titanium to modify the properties of the pigment when used.

When the pigment is to be used in a paint it is desirable that the pigment should exhibit a high degree of photochemical stability i.e., durability. Pigments that are not sufficiently photochemically stable interact with light and produce reactive species which result in degradation of the binding medium i.e. resin or film forming polymer, with the eventual breakdown of the paint film taking place.

Coating processes for titanium dioxide pigment have been described in U.S. Pat. Nos. 3,146,119, 3,251,705, 3,522,078, 3,513,007 and 3,515,566. Typically these patent specifications described various alternative treatment processes for titanium dioxide pigments to modify the properties of the pigment when used. Many of such processes involve the treatment of the pigment with mixed hydrous oxides of aluminium, silicon and titanium and the application of double coatings.

Alternative processes involve the calcination of coated titanium dioxide pigments to dehydrate the coatings to produce a pigment said to have a high durability. Further processes involve the deposition of a hydrous oxide of silica from an active source of silica under carefully controlled conditions followed by the deposition of an outer coating of a hydrous oxide of aluminium.

It is desirable to produce a process for coating titanium dioxide pigment which has an extremely high durability whilst retaining an acceptible opacity and it is the object of the present invention to achieve such a pigment by a relatively simple process and by a process which can be easily commercially operated.

According to the present invention a process for the production of pigmentary titanium dioxide comprises forming an aqueous suspension of particles of titanium dioxide containing a water soluble silicate adding to the so formed suspension an acidic source of a soluble oxide of zirconium, hafnium or titanium while maintaining the pH of the suspension at a value of 1 to 3.5 and thereby precipitating a hydrous oxide of silicon on the particles and raising the pH of the suspension to effect complete precipitation of a hydrous oxide of zirconium, hafnium or titanium on the particles.

The process of the present invention generally involves the coating of titanium dioxide with a hydrous oxide of silica and a hydrous oxide of zirconium, hafnium or titanium in a specified manner. Initially a suspension of titanium dioxide is prepared.

The titanium dioxide suspension can be prepared by mixing the pigment with water, with a dispersing agent, if necessary, or it can be the slurry obtained when milling a titanium dioxide pigment. The pigment can be that prepared by the "sulphate" process in which concentrated sulphuric acid is employed to digest a titaniferous ore with subsequent dissolution of the digestion cake, hydrolysis and calcination of purified titanium dioxide or alternatively the pigment can be that obtained by the vapour phase oxidation of a titanium tetrahalide.

The titanium dioxide pigment can be either the anatase form or rutile form but preferably the pigment is the rutile form. Usually the pigment will have an average particle size of 0.15 to 0.3 microns preferably of 0.2 to 0.25 microns.

Often it is desirable to employ a dispersing agent to assist the dispersion of titanium dioxide in water to form an aqueous suspension or slurry, particularly in the case of pigments prepared by the "sulphate" process. A typical dispersing agent is an alkali metal silicate e.g. sodium silicate and when such a silicate is used then this will be present at the commencement of the coating process according to the present invention and will, accordingly, form at least a part of the source of the hydrous oxide of silicon.

Usually it will be necessary to add to the aqueous suspension of titanium dioxide a water-soluble silicate to form the source of the hydrous oxide of silicon. Typically, this source is an alkali metal silicate such as one of the commercially available forms of sodium silicate or potassium silicate but preferably it is the sodium silicate that is used. The amount added will depend on the amount of sodium silicate already present as a dispersing agent and on the amount of the coating of the hydrous oxide of silicon that it is desired to deposit on the pigment.

The precipitation of the hydrous oxide of silicon on the pigment is effected at a pH of between 1 and 3.5 in the presence of a soluble oxide of zirconium, hafnium or titanium. In fact, it is the interaction between the soluble oxide, which is acidic in nature, and the silicate which effects the precipitation.

The precipitation is effected at a pH between 1.0 and 3.5, more often 1 to 3.0, and preferably for zirconium and hafnium oxide the pH is between 1.5 and 3 and for titanium oxide the pH is between 2.5 and 3.5. Generally, the pH of the aqueous suspension containing the silicate is reduced from its initial alkaline pH to no more than 3.5 prior to addition of the acidic source of soluble oxide of zirconium, hafnium, or titanium or the soluble oxide itself. The reduction of pH can be effected by the addition of an acid, usually a mineral acid such as sulphuric acid or hydrochloric acid. Preferably the acid is added as quickly as possible.

The acid soluble oxide species can be formed in situ in the aqueous suspension or can be formed before addition to the aqueous suspension. An acidic water-soluble salt of zirconium, hafnium or titanium can be added to the aqueous suspension while maintaining the pH at between 1.0 and 3.5 by adding an alkali usually simultaneously with the water-soluble salt.

Examples of acidic salts which may be used as the source of the soluble oxide of zirconium, hafnium or titanium are water-soluble inorganic salts such as zirconium sulphate, zirconyl chloride, hafnium sulphate, titanium sulphate or titanium chloride. Usually the salt will be added to the aqueous suspension in the form of an aqueous solution.

The soluble oxide of zirconium or hafnium can be formed prior to the addition to the aqueous suspension by adding an alkali to a solution of a salt of zirconium or hafnium. The addition of alkali is usually stopped just before the onset of precipitation of insoluble metal hydroxide. For best results the temperature of the solution is maintained at a temperature of 60°C to 95°C, usually about 90°C during the formation of the soluble species. Typically aqueous sodium hydroxide is added to an aqueous solution of zirconyl chloride at 90°C.

If desired, a source of a phosphate can be added to the aqueous suspension usually following the addition of the solution of the soluble oxide species. Typical sources of phosphate are sodium dihydrogen phosphate and orthophosphoric acid.

On addition of the soluble metal forming species or its generation in situ at a pH between 1.0 and 3.5 deposition of a hydrous oxide of silicon occurs on the pigment particles. At the same time, precipitation of the hydrous oxide of the metal takes place. Operation at the most preferred pH at which the deposition takes place ensures the maximum deposition of the hydrous oxide of silicon and the minimum re-solution of the hydrous oxide of silica from the surface.

When the desired amount of hydrous oxide of silicon has been deposited the pH of the aqueous suspension is raised to effect the complete precipitation of the hydrous oxide of zirconium, hafnium or titanium. Usually, it is necessary to raise the pH to a value of at least 5 and often the pH is raised to at least 7.5, say 8.5.

The amount of the coating of hydrous oxide of silicon applied to the pigment is usually from 0.5 percent to 20 percent of the weight of $TiO_2$, preferably from 2 percent to 6 percent by weight. The amount of hydrous oxide of zirconium, hafnium or titanium which is precipitated on the particles is usually from 0.1 to 15 percent expressed as the oxide preferably 0.5 to 5 percent of $TiO_2$. If desired, initially a small amount of the source of the soluble oxide of zirconium, hafnium or titanium can be added at the appropriate pH level to effect the precipitation and then a further quantitiy can be added.

It is preferred to apply a further coating of one or more hydrous oxides to the coated pigment after treatment according to the process of the invention. Typical hydrous oxides that can be present in the further coating are those of aluminium, titanium, cerium, zirconium, zinc or of silicon. For example, the coating can be formed by adding to the suspension of the coated pigment a water-soluble hydrolysable compound or mixture thereof or a solution thereof and adjusting the pH to effect the precipitation of the coating. The salt can either be an acid reacting salt in which case it is usual to raise the pH of the suspension to at least 7 prior to the addition of the salt or the salt can be an alkaline reacting salt such as sodium aluminate then this and sodium hydroxide can be added directly to the aqueous suspension of coated pigment without the prior adjustment of pH in the process of the invention. The initial addition of the sodium aluminate serves to increase the pH.

The pH of the aqueous suspension is usually finally adjusted to a value in the range pH 6.5 to 8.5 to obtain the required final packed pigment pH and to effect the complete precipitation of the further coating.

Usually, the further coating will contain a hydrous oxide, preferably of aluminium, in an amount of from 0.1 to 10 percent (as the oxide) by weight preferably 0.5 to 5 percent by weight on $TiO_2$. Optionally a hydrous oxide of silicon can also be present in an amount of 0.1 to 10 percent (as the oxide) by weight of $TiO_2$, Preferably 0.25 to 5 percent by weight.

The coated pigment is separated, usually by filtration, from the aqueous suspension, dried and, if desired, fluid energy milled.

The coated pigments obtained by the process of the present invention have a high durability when used in paint as compared to a pigment having a coating of hydrous silica, hydrous alumina and hydrous titania applied by conventional methods.

The invention is illustrated in the following examples in which reference will be made to further coating A or B which are applied as follows:

Further Coating A

Add to the suspension drop-wise the equivalent of 0.25 percent $SiO_2$ (as aqueous sodium silicate solution containing the equivalent of 100 grams/litre $SiO_2$) followed by the equivalent of 0.75 percent $Al_2O_3$ (as aluminium sulphate solution containing the equivalent of 100 grams/litre $Al_2O_3$) with the percentage amounts being based on the weight of $TiO_2$. Finally the suspension is neutralised to pH 8.5 by adding sodium hydroxide solution.

Further Coating B

The pH of the aqueous suspension is raised to 10.5 by the addition of an aqueous solution of sodium aluminate containing sodium hydroxide. The amount of sodium aluminate added is sufficient to provide the equivalent of from 0.3 to 3.0 percent $Al_2O_3$ on $TiO_2$. The pH of the suspension is then lowered to approximately 6.5 by adding sulphuric acid.

In the following Examples all percent quantities of reagents are based on the weight of $TiO_2$.

In the following Examples the titanium dioxide pigment which was used was an uncoated pigment that had been prepared by the vapour phase oxidation of titanium tetrachloride. The pigment was a rutile pigment and was formed into a slurry in water at a concentration of 200 grams/litre. Constant stirring was maintained throughout all the experiments.

EXAMPLE 1

An amount of slurry of titanium dioxide pigment containing 500 grams of $TiO_2$ was heated to 45°C and aqueous sodium silicate solution containing the equivalent of 100 grams/litre $SiO_2$ was added over a period of 25 minutes in an amount sufficient to introduce the equivalent of 4 percent $SiO_2$. Dilute sulphuric acid was then added to the suspension to reduce the pH to 3.0. Aqueous zirconium sulphate solution containing the equivalent of 270 grams/litre expressed as $ZrO_2$ was added in an amount sufficient to introduce the equivalent of 1 percent $ZrO_2$ simultaneously but separately with sodium hydroxide solution to maintain the pH of the suspension at 3.0. The addition of zirconium sulphate solution was made over a period of 30 minutes. Sodium hydroxide solution was then added to raise the ph to 5.0 and finally further Coating A was applied.

The coated pigment was recovered, washed, dried and fluid energy milled.

EXAMPLE 2

Example 1 was repeated except that after the addition of sulphuric acid to reduce the pH to 3.0 the temperature of the suspension was raised to 90°C prior to the addition of zirconium sulphate solution. After the addition of the zirconium sulphate solution simultaneously with sodium hydroxide the suspension was cooled to 45°C and finally prior to the application of a Further Coating A an amount of sodium hydroxide was added sufficient to raise the pH to 8.5 instead of to 5.0.

EXAMPLE 3

An amount of the suspension of titanium dioxide containing 500 grams $TiO_2$ was heated to 45°C. Aqueous sodium silicate solution containing the equivalent of 100 grams/litre $SiO_2$ was added to the suspension in an amount sufficient to introduce the equivalent of 4 percent $SiO_2$. Dilute sulphuric acid was then added to reduce the pH to 3.0. Aqueous zirconium sulphate solution containing the equivalent of 270 grams/litre $ZrO_2$ was added over a period of 25 minutes in an amount sufficient to introduce the equivalent of 1 percent $ZrO_2$ simultaneously but separately with sodium hydroxide solution to maintain the pH at 3.0. Aqueous sodium dihydrogenphosphate solution was then added in an amount sufficient to introduce the equivalent of 0.45 percent $P_2O_5$.

Further Coating B was then applied with the amount of sodium aluminate added sufficient to introduce 0.8 percent $Al_2O_3$.

The coated pigment obtained was recovered, washed, dried and fluid energy milled.

EXAMPLE 4

An amount of the suspension of titanium dioxide containing 500 grams $TiO_2$ was heated to 45°C. To the suspension there was added aqueous sodium silicate solution containing the equivalent of 100 grams/litre $SiO_2$ in an amount sufficient to introduce the equivalent of 4 percent $SiO_2$ over a period of 25 minutes. Dilute hydrochloric acid was then added to the suspension to reduce the pH to 1.8. Aqueous zirconyl chloride solution containing the equivalent of 95 grams/litre $ZrO_2$ in an amount sufficient to introduce the equivalent of 1 percent $ZrO_2$ was added over a period of 30 minutes simultaneously but separately with sodium hydroxide solution to maintain the pH at 1.8. A further quantity of sodium hydroxide solution was then added to raise the pH to 5.0.

Further Coating A was applied.

Finally the coated pigment was recovered, washed, dried and fluid energy milled.

EXAMPLE 5

Example 4 was repeated except that after the addition of hydrochloric acid to the suspension to reduce the pH to 1.8 the suspension was heated to 90°C. After the simultaneous addition of zirconyl chloride solution and sodium hydroxide the suspension was cooled to 45°C prior to the addition of a further solution of sodium hydroxide to raise the pH to 8.5 instead of 5.0.

EXAMPLE 6

An amount of the suspension of titanium dioxide containing 500 grams $TiO_2$ was heated to 45°C. Aqueous sodium silicate solution containing the equivalent of 100 grams/litre $SiO_2$ was added in an amount sufficient to introduce the equivalent of 0.5 percent $SiO_2$. Dilute hydrochloric acid was then added to reduce the pH to 1.8 and the temperature of the suspension was raised to 90°C. A further quantity of the aqueous sodium silicate solution sufficient to introduce the equivalent of 1.5 percent $SiO_2$ and aqueous zirconyl chloride solution containing the equivalent of 95 grams/litre $ZrO_2$ in an amount sufficient to introduce the equivalent of 1 percent $ZrO_2$ were added simultaneously but separately to the suspension to maintain the pH at 1.8.

A further quantity of the sodium silicate solution in an amount sufficient to introduce the equivalent of 2.0 percent $SiO_2$ and hydrochloric acid were then added to maintain the pH at 1.8.

The suspension was then cooled to 45°C and a solution of sodium hydroxide added to raise the pH to 8.5.

Finally Further Coating A was applied.

The coated pigment was recovered, washed, dried and fluid energy milled.

EXAMPLE 7

An amount of the suspension of titanium dioxide containing 500 grams $TiO_2$ was heated to 45°C. To the suspension there was added over a period of 25 minutes aqueous sodium silicate solution containing the equivalent of 100 grams/litre $SiO_2$ in an amount sufficient to introduce the equivalent of 4 percent $SiO_2$. Dilute hydrochloric acid was then added to the suspension to reduce the pH to 1.8.

Aqueous zirconyl chloride solution containing the equivalent of 90 grams/litre $ZrO_2$ was added over a period of 25 minutes in an amount sufficient to introduce 1 percent $ZrO_2$. Aqueous sodium dihydrogenphosphate solution was then added over a period of 10 minutes in an amount sufficient to introduce the equivalent of 0.45 percent $P_2O_5$.

Finally Further Coating B was applied and the amount of sodium aluminate added was sufficient to provide the equivalent of 0.6 percent $Al_2O_3$.

The coated pigment was recovered, washed, dried and fluid energy milled.

EXAMPLE 8

Example 7 was repeated except that after the addition of the hydrochloric acid to reduce the pH to 1.8 the suspension was heated to 90°C. and during the addition of the zirconyl chloride solution hydroxide solution was separately but simultaneously added to maintain the pH at 1.8. After the addition of the sodium dihydrogenphosphate solution Further Coating B was applied but using an amount of sodium aluminate sufficient to introduce the equivalent of 0.45 percent $Al_2O_3$.

EXAMPLE 9

An amount of the suspension of titanium dioxide containing 500 grams/$TiO_2$ was heated to 45°C. Aqueous sodium silicate solution containing the equivalent of 100 grams/litre $SiO_2$ was added over a period of 25 minutes in an amount sufficient to introduce the equivalent of 4 percent $SiO_2$. Dilute hydrochloric acid was added in an amount sufficient to reduce the pH to 6.5 and then the suspension was heated to 90°C. A further quantity of dilute hydrochloric acid was then added to reduce the pH to 1.8.

Aqueous zirconyl chloride solution containing the equivalent of 95 grams/litre $ZrO_2$ was then added in an amount sufficient to introduce the equivalent of 1 percent $ZrO_2$ simultaneously and separately with sodium hydroxide solution in an amount sufficient to maintain the pH at 1.8. The suspension was then cooled to 45°C and a further quantity of sodium hydroxide solution added to raise the pH to 8.5. Finally Further Coating A was applied.

Finally the coated pigment was recovered, washed, dried and fluid energy milled.

EXAMPLE 10

An amount of the suspension of titanium dioxide containing 500 grams $TiO_2$ was heated to 45°C. To this was added an aqueous solution of sodium silicate solution containing the equivalent of 100 grams/litre $SiO_2$ in an amount sufficient to introduce 4 percent $SiO_2$ over a period of 25 minutes. Dilute sulphuric acid was added to the suspension to reduce the pH to 3.0. An aqueous solution of titanyl sulphate containing 320 grams/litre $TiO_2$ was added to the suspension in an amount equivalent to 1 percent $TiO_2$ simultaneously and separately with a solution of sodium hydroxide in an amount sufficient to maintain the pH at 3.0.

A further quantity of sodium hydroxide solution was then added to raise the pH to 5.0 and further Coating A was applied.

Finally the coated pigment was recovered, washed, dried and fluid energy milled.

EXAMPLE 11

Example 10 was repeated except that after the addition of the sulphuric acid to reduce the pH to 3.0 the suspension was heated to 90°C. Finally sufficient sodium hydroxide solution was added to raise the pH to 8.5 instead of to 5.0.

EXAMPLE 12

An amount of the suspension of titanium dioxide containing 500 grams $TiO_2$ was heated to 45°C. To this suspension there was added, over a period of 25 minutes aqueous sodium silicate solution containing the equivalent of 100 grams/litre $SiO_2$ in an amount equivalent to 4 percent $SiO_2$. The pH of the suspension was then raised to 3.0 by the addition of dilute sulphuric acid.

A solution of titanyl sulphate containing the equivalent of 320 grams/litre $TiO_2$ was then added over a period of 20 minutes in an amount sufficient to introduce the equivalent of 1 percent $TiO_2$ separately but simultaneously with sodium hydroxide solution to maintain the pH at 3.0.

An aqueous solution of sodium dihydrogenphosphate was then added in an amount such as to introduce the equivalent of 0.45 percent $P_2O_5$.

Finally Further Coating B was applied using an amount of sodium aluminate equivalent to 0.8 percent $Al_2O_3$.

The coated pigment was recovered, washed, dried and fluid energy milled.

The pigments produced in the preceding Examples were tested to determine their opacity, gloss and durability ratio when incorporated in paints.

The opacity of the pigment was measured by determining the reflectance of a paint film containing the pigment on a glass panel which was placed in optical contact with a black tile. The reflectance was measured on a Harrison colourmeter. The paint was based on a long oil pentaerythritol modified alkyd resin containing the particular pigment in a pigment volume concentration of 10 percent.

The gloss of the pigment was determined by incorporating the pigment in an acrylic stoving enamel and measuring the gloss directly on a gloss meter.

The durability ratio was measured by exposing a sample of an acrylic stoving paint in a weatherometer and determining the weight loss. A standard pigment incorporated in a similar paint was similarly exposed and the weight loss of the standard paint determined. The durability ratio was determined according to the formula:

Durability Ratio = weight loss of paint under test/weight loss of standard paint The standard pigment used in the standard paint to determine the durability ratio was selected from commercially available pigments and was one which was considered to have a high durability and acceptable performance in many applications. The pigment was a rutile titanium dioxide prepared by the "sulphate" process which was coated with a hydrous oxide of silica in an amount of 1.3 percent as $SiO_2$, a hydrous oxide of alumina in an amount of 2 percent as $Al_2O_3$ and a hydrous oxide of titanium in an amount of 1.5 percent as $TiO_2$ on the weight of $TiO_2$ in the pigment.

The results of the above measurements were compared with those obtained on a paint containing a pigment which was known to have an extremely high durability. This control pigment prepared by coating titanium dioxide prepared by the "chloride" process by adding to an aqueous suspension of the pigment sodium silicate solution simultaneously with a dilite acid to maintain the pH of the suspension at 9 followed by the application of an outer coating of hydrous alumina. The amount of hydrous silica deposited was 4 percent expressed as $SiO_2$ and the amount of hydrous alumina coating was 2 percent expressed as $Al_2O_3$ both by weight of $TiO_2$.

The results of the experiments are shown in the following Table:

| Pigment of Example No. | Opacity | Gloss | Durability ratio |
|---|---|---|---|
| 1 | 487.0 | 90.5 | 0.91 |
| 2 | 486.5 | 90.0 | 0.81 |
| 3 | 486.0 | 91.5 | 0.70 |
| 4 | 487.0 | 91.5 | 0.88 |
| 5 | 485.5 | 90.5 | 0.84 |
| 6 | 484.0 | 86.0 | 0.89 |
| 7 | 487.5 | 91.0 | 0.79 |
| 8 | 488.0 | 90.5 | 0.72 |
| 9 | 485.0 | 87.0 | 0.74 |
| 10 | 485.0 | 92.0 | 0.93 |
| 11 | 488.5 | 90.0 | 0.90 |
| 12 | 485.0 | 92.0 | 0.82 |
| Control | 487.5 | 87.0 | 0.94 |

The above results quite clearly show the superiority of the pigments prepared according to the Examples in so far as durability and gloss is concerned. The opacities of the pigments are substantially equal to that of the control.

The experiments described in Examples 1 to 12 but using a hafnium compound instead of the zirconium or the titanium compounds produced similar pigments.

What is claimed is:

1. A process for the production of pigmentary titanium dioxide which comprises forming an aqueous suspension or slurry of particles of titanium dioxide containing a water-soluble silicate, reducing the pH of said suspension to a value within the range 1.0 and 3.5, adding to the acidified suspension or slurry a water-soluble acidic compound of a metal selected from the class consisting of zirconium, hafnium and titanium, and an alkali or an alkali metal silicate, to maintain the pH of the suspension at a value of 1 to 3.5 and thereby precipitating a hydrous oxide of silicon on the particles, and raising the pH of the suspension to effect complete precipitation of a hydrous oxide of zirconium, hafnium or titanium on the particles.

2. A process according to claim 1 wherein the pH of said suspension or slurry is reduced rapidly to a value within the range 1.0 to 3.5 by adding mineral acid to said suspension as quickly as possible.

3. A process according to claim 1 in which the pH of the suspension or slurry in maintained at a value of from 1.0 to 3.0.

4. A process according to claim 1 in which the acidic compound of zirconium is added to the suspension or slurry while maintaining the pH at a value of from 1.5 to 3.0.

5. A process according to claim 1 in which the acidic compound of hafnium is added to the suspension or slurry while maintaining the pH at a value of from 1.5 to 3.0.

6. A process according to claim 1 in which the acidic compound of titanium is added to the suspension or slurry while maintaining the pH at a value of from 2.5 to 3.5.

7. A process according to claim 1 in which a source of a phosphate selected from the group consisting of sodium dihydrogen phosphate and orthophosphoric acid is added to the aqueous suspension or slurry after the addition of the said acidic compound.

8. A process according to claim 1 in which the pH of the suspension or slurry is raised to at least 5 to effect complete precipitation of the hydrous oxide of zirconium, hafnium or titanium.

9. A process according to claim 8 in which the pH is raised to at least 7.5.

10. A process according to claim 1 in which the amount of hydrous oxide of silicon precipitated is from 0.5 to 20 percent expressed as $SiO_2$ on the weight of $TiO_2$.

11. A process according to claim 10 in which the amount of hydrous oxide of silicon is from 2 to 6 percent expressed as $SiO_2$ on the weight of $TiO_2$.

12. A process according to claim 1 in which the amount of hydrous oxide of zirconium, hafnium or titanium which is precipitated is from 0.1 to 15 percent expressed as the oxide by weight of $TiO_2$.

13. A process according to claim 12 in which the amount of hydrous oxide of zirconium, hafnium or titanium which is precipitated is from 0.5 to 5 percent expressed as the oxide by weight of $TiO_2$.

14. A process according to claim 12 in which sufficient of the said acidic compound is added to the suspension or slurry initially to precipitate the hydrous oxide of silicon followed by the remainder of the said acidic compound.

15. A process according to claim 1 in which after the precipitation of the hydrous oxide of zirconium, hafnium or titanium a further coating is applied by adding to the suspension or slurry of titanium dioxide a water-soluble hydrolysable compound of aluminium, titanium, cerium, zinc, zirconium or silicon and adjusting the ph of the suspension or slurry to effect precipitation of the coating.

16. A process according to claim 1 in which the titanium dioxide is rutile titanium dioxide pigment prepared by the vapour phase oxidation of titanium tetrachloride.

17. A process for the production of pigmentary titanium dioxide which consists essentially of forming an aqueous suspension of particles of titanium dioxide containing a water-soluble silicate, reducing the pH of said suspension to a value within the range 1.0 and 3.5, adding to the so formed suspension a water-soluble acidic compound of a metal selected from the class consisting of zirconium, hafnium and titanium and sufficient alkali or alkali metal silicate to maintain the ph of the suspension at a value of 1 to 3.5 and thereby precipitating a hydrous oxide of silicon on the particles, and raising the pH of the suspension to effect complete precipitation of a hydrous oxide of zirconium, hafnium or titanium on the particles.

18. A process according to claim 17 wherein the pH of said suspension or slurry is reduced rapidly to a value within the range 1.0 and 3.5 by adding mineral acid to said suspension as quickly as possible.

* * * * *